US012647881B2

(12) United States Patent
Dhanani et al.

(10) Patent No.: US 12,647,881 B2
(45) Date of Patent: Jun. 2, 2026

(54) SMART CELL SELECTION

(71) Applicant: Apple Inc., Cupertino, CA (US)

(72) Inventors: Tarakkumar G. Dhanani, San Jose, CA (US); Karan R. Sachdev, Santa Clara, CA (US); Rohit Thareja, Redwood City, CA (US); Sanjeevi Balasubramanian, San Jose, CA (US); Sharad Garg, Cupertino, CA (US); Vijay Gadde, San Jose, CA (US); Vijay Venkataraman, San Jose, CA (US)

(73) Assignee: APPLE INC., Cupertino, CA (US)

( * ) Notice: Subject to any disclaimer, the term of this patent is extended or adjusted under 35 U.S.C. 154(b) by 333 days.

(21) Appl. No.: 18/141,878

(22) Filed: May 1, 2023

(65) Prior Publication Data

US 2023/0370966 A1 Nov. 16, 2023

Related U.S. Application Data

(60) Provisional application No. 63/341,587, filed on May 13, 2022.

(51) Int. Cl.
| | |
|---|---|
| *H04W 48/20* | (2009.01) |
| *H04B 17/309* | (2015.01) |
| *H04L 5/14* | (2006.01) |
| *H04W 74/08* | (2024.01) |
| *H04W 74/0833* | (2024.01) |

(52) U.S. Cl.
CPC .......... *H04W 48/20* (2013.01); *H04B 17/347* (2023.05); *H04L 5/1469* (2013.01); *H04W 74/0833* (2013.01)

(58) Field of Classification Search
CPC ............ H04W 48/20; H04W 74/0833; H04W 36/0044; H04W 36/0061; H04W 36/00835; H04W 36/302; H04W 36/304; H04B 17/347; H04L 5/1469
USPC .................................. 370/329–330, 331–332
See application file for complete search history.

(56) References Cited

U.S. PATENT DOCUMENTS

| | | | | |
|---|---|---|---|---|
| 2013/0310037 A1* | 11/2013 | Ji | .......................... | H04L 5/0091 |
| | | | | 455/436 |
| 2014/0378144 A1* | 12/2014 | Legg | ................. | H04W 36/0058 |
| | | | | 455/437 |
| 2015/0055630 A1* | 2/2015 | Attar | ................... | H04W 36/302 |
| | | | | 370/332 |
| 2015/0334612 A1* | 11/2015 | Ray Chaudhuri | .... | H04W 36/20 |
| | | | | 455/437 |
| 2017/0332283 A1* | 11/2017 | Kubota | ................. | H04W 72/23 |
| 2018/0206256 A1* | 7/2018 | Bang | .................... | H04W 72/21 |
| 2018/0317145 A1* | 11/2018 | Melin | .................. | H04W 36/14 |

(Continued)

*Primary Examiner* — Candal Elpenord
(74) *Attorney, Agent, or Firm* — Kilpatrick Townsend & Stockton LLP

(57) ABSTRACT

The present application relates to improving a roaming service. In an example, user equipment (UE) initiates a cell selection process to choose between a first cell and a second cell. The UE evaluates a first uplink (UL) channel condition of the first cell and a second UL channel condition of the second cell based on the initiation. The UE selects the first cell or the second cell based on the evaluated first UL channel condition and second UL channel condition. The UE initiates a random access channel (RACH) procedure based on the selected first cell or second cell.

20 Claims, 10 Drawing Sheets

(56)                    References Cited

U.S. PATENT DOCUMENTS

| | | | |
|---|---|---|---|
| 2019/0037605 A1* | 1/2019 | Agiwal | H04L 5/0048 |
| 2021/0321306 A1* | 10/2021 | Bin Redhwan | H04W 36/0058 |
| 2021/0378027 A1* | 12/2021 | Wang | H04W 36/0077 |
| 2022/0039175 A1* | 2/2022 | Zhou | H04W 36/00837 |
| 2022/0286866 A1* | 9/2022 | Liu | H04B 7/0626 |
| 2023/0092324 A1* | 3/2023 | Seidel | H04W 74/0833 |
| | | | 370/329 |
| 2023/0139950 A1* | 5/2023 | Damnjanovic | H04W 36/362 |
| | | | 370/331 |

* cited by examiner

200

MICROCELL 206

MICRO BASE STATION 208

UE 210

MACROCELL 202

MACRO BASE STATION 204

500

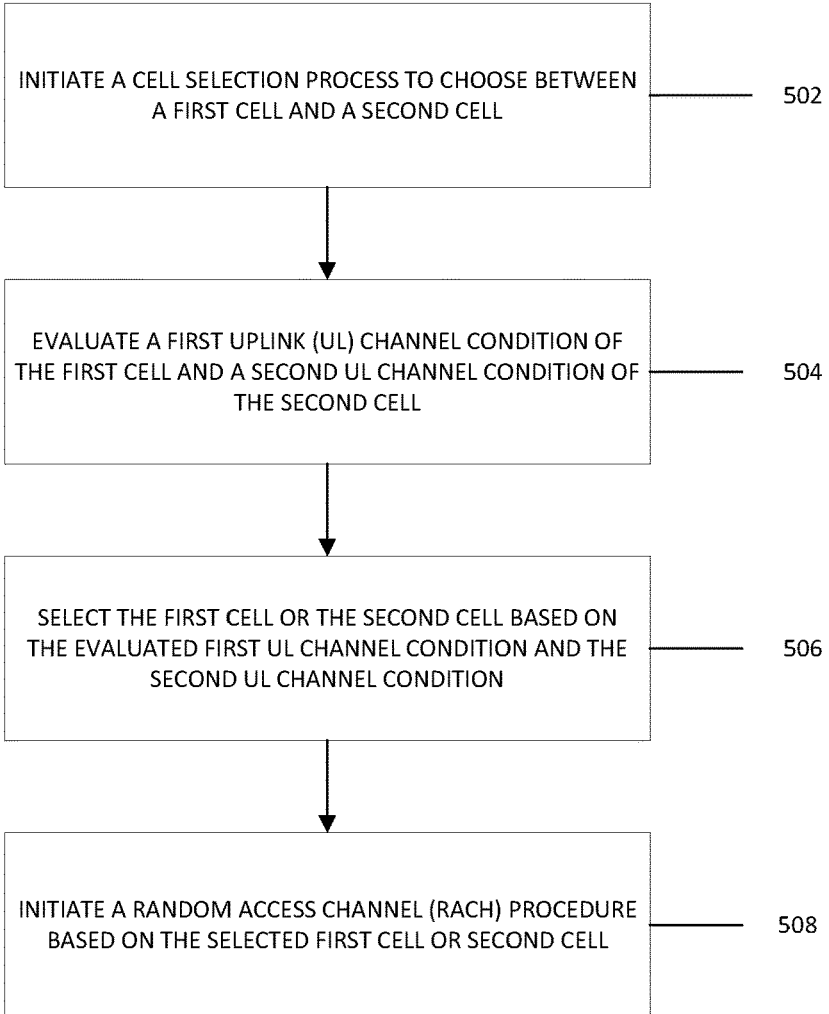

INITIATE A CELL SELECTION PROCESS TO CHOOSE BETWEEN A FIRST CELL AND A SECOND CELL — 502

EVALUATE A FIRST UPLINK (UL) CHANNEL CONDITION OF THE FIRST CELL AND A SECOND UL CHANNEL CONDITION OF THE SECOND CELL — 504

SELECT THE FIRST CELL OR THE SECOND CELL BASED ON THE EVALUATED FIRST UL CHANNEL CONDITION AND THE SECOND UL CHANNEL CONDITION — 506

INITIATE A RANDOM ACCESS CHANNEL (RACH) PROCEDURE BASED ON THE SELECTED FIRST CELL OR SECOND CELL — 508

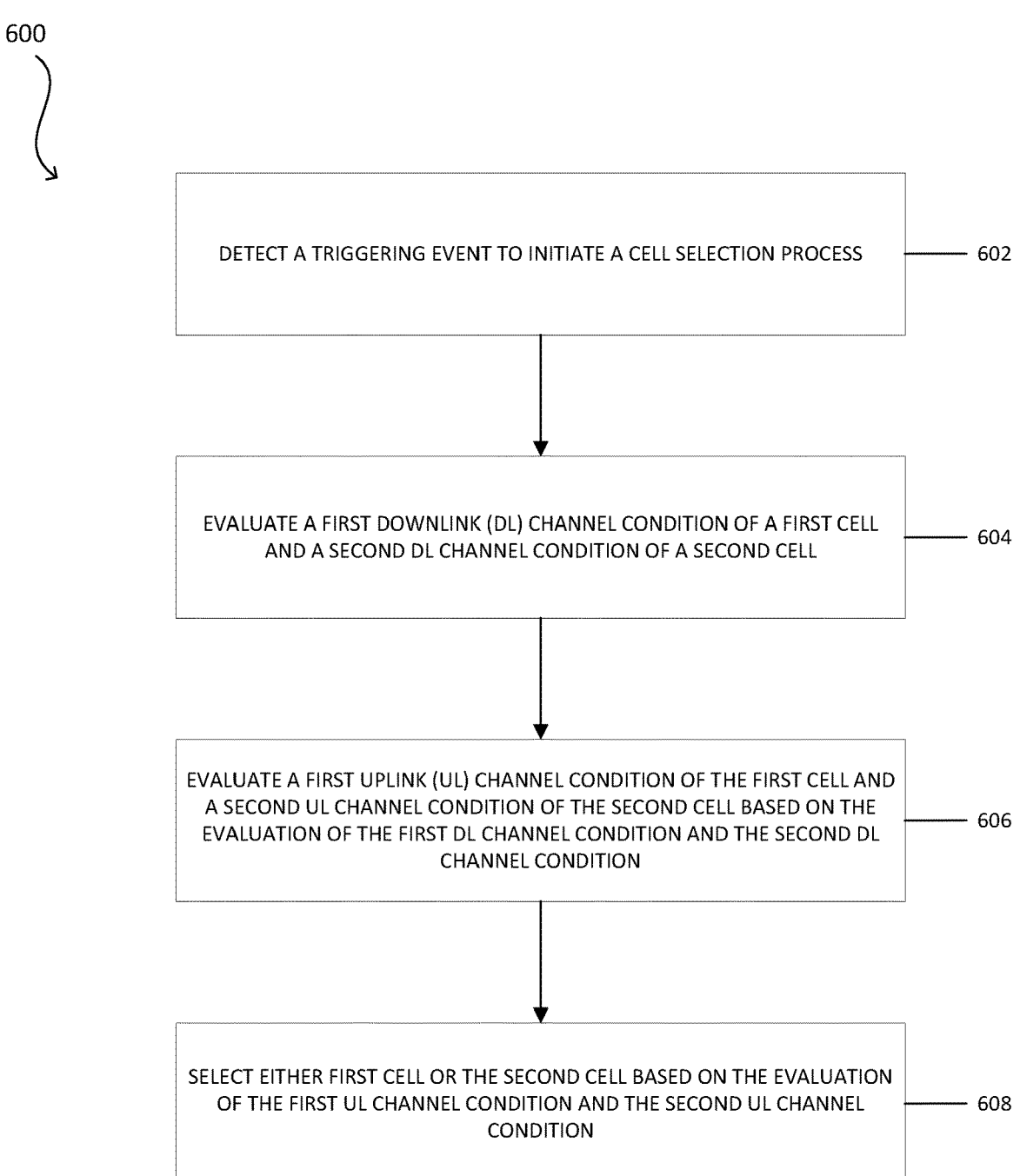

DETECT A TRIGGERING EVENT TO INITIATE A CELL SELECTION PROCESS —— 602

EVALUATE A FIRST DOWNLINK (DL) CHANNEL CONDITION OF A FIRST CELL AND A SECOND DL CHANNEL CONDITION OF A SECOND CELL —— 604

EVALUATE A FIRST UPLINK (UL) CHANNEL CONDITION OF THE FIRST CELL AND A SECOND UL CHANNEL CONDITION OF THE SECOND CELL BASED ON THE EVALUATION OF THE FIRST DL CHANNEL CONDITION AND THE SECOND DL CHANNEL CONDITION —— 606

SELECT EITHER FIRST CELL OR THE SECOND CELL BASED ON THE EVALUATION OF THE FIRST UL CHANNEL CONDITION AND THE SECOND UL CHANNEL CONDITION —— 608

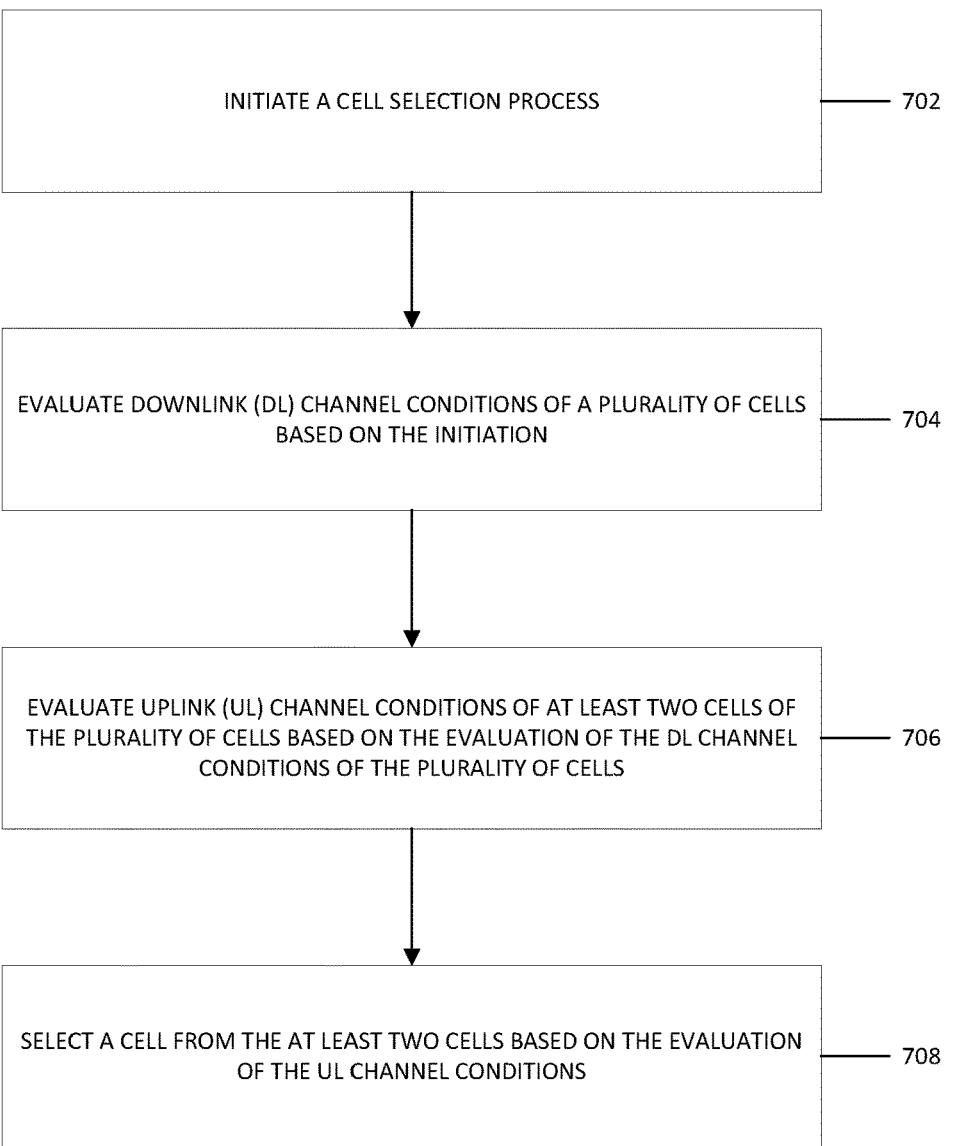

INITIATE A CELL SELECTION PROCESS ——— 702

EVALUATE DOWNLINK (DL) CHANNEL CONDITIONS OF A PLURALITY OF CELLS BASED ON THE INITIATION ——— 704

EVALUATE UPLINK (UL) CHANNEL CONDITIONS OF AT LEAST TWO CELLS OF THE PLURALITY OF CELLS BASED ON THE EVALUATION OF THE DL CHANNEL CONDITIONS OF THE PLURALITY OF CELLS ——— 706

SELECT A CELL FROM THE AT LEAST TWO CELLS BASED ON THE EVALUATION OF THE UL CHANNEL CONDITIONS ——— 708

FIG. 7

SMART CELL SELECTION

CROSS-REFERENCE TO RELATED APPLICATIONS

This application is claims priority under 35 U.S.C. § 119(e) to U.S. Provisional Application No. 63/341,587, filed on May 13, 2022, entitled "Smart Cell Selection," the contents of which are herein incorporated by reference.

FIELD

Cellular communications can be defined in various standards to enable communications between a user equipment and a cellular network. For example, a long-term evolution (LTE) network and Fifth generation mobile network (5G) are wireless standards that aim to improve upon data transmission speed, reliability, availability, and more.

BRIEF DESCRIPTION OF THE DRAWINGS

FIG. 5 illustrates an example process flow for smart cell selection, in accordance with some embodiments.

FIG. 6 illustrates an example process flow for smart cell selection, in accordance with some embodiments.

FIG. 7 illustrates an example process flow for smart cell selection, in accordance with some embodiments.

DETAILED DESCRIPTION

Figure 1:
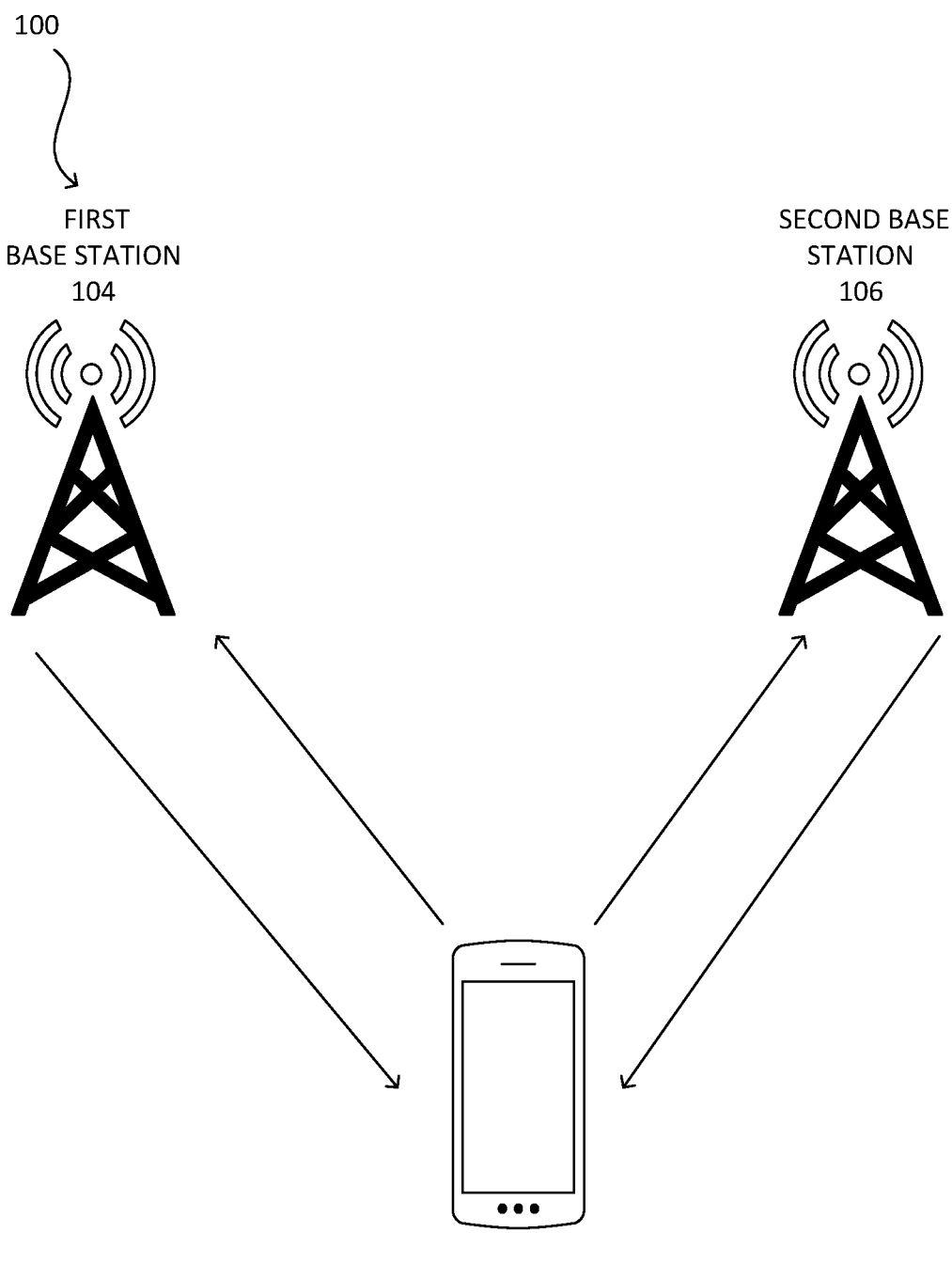
FIG. 1 illustrates an example system for smart cell selection, in accordance with some embodiments.

The following detailed description refers to the accompanying drawings. The same reference numbers may be used in different drawings to identify the same or similar elements. In the following description, for purposes of explanation and not limitation, specific details are set forth, such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

A user equipment (UE) can select a suitable cell to camp on (register) by scanning all radio frequency (RF) channels within its supported frequency bands. The conventional approach is for the UE to consider the downlink (DL) channel conditions of each candidate cell and disregard the uplink (UL) channel conditions. However, this approach can be inefficient as it does not take into account any UL channel conditions between the UE and a base station of each cell.

For example, the UE can be executing a cell selection procedure selecting between a macrocell and a microcell, where a base station of the microcell has a lower transmission power than a base station of the macrocell. The base station of the microcell and the base station of the macrocell can have similar DL transmission power. However, even though the base station of the microcell may be closer to the UE than the base station of the macrocell, the UE is likely to select the macrocell. The disparity in distance can result in a remarkable difference in UL path-loss between the microcell and the macrocell. However, as indicated above, the UE does not even consider the difference in UL path-loss for cell selection. Therefore, as the UE is likely to select the macrocell, the UE is accepting a higher UL path-loss, which leads to degradation of the UE's performance compared to if it had chosen the microcell.

Embodiments of the present disclosure address the above-described issues via a UE configured to initiate a cell selection procedure that considers UL channel conditions, such as UL path-loss and similar UL key performance indicators (KPIs), as well as DL channel conditions. For a first network, such as a 5G network, the UE can evaluate synchronization signal-reference signal received power (SS-RSRP). For a second network, such as a long-term evolution network (LTE), the UE can evaluate the primary synchronization signals (PSSs) and secondary synchronization signals (SSSs) of each candidate cell. If signal measurements are not within a threshold decibel (dB) range of each other, the UE can select the cell with greater DL channel conditions. The greater DL channel conditions can be based on, for example, higher transmission power between a base station and a UE. If the, however, the signal measurements are within a threshold dB range of each, the UE can select a cell based on greater UL channel conditions. The greater UL channel conditions can be based on, for example, lesser signal attenuation between a UE and a base station. Therefore, in situations in which multiple candidate cells exhibit similar DL radio frequency (RF) conditions, the UE can select a cell to synchronize with based on a comparison of the UL channel conditions of each candidate cell.

Embodiments of the present disclosure are described in connection with 5G networks. However, the embodiments are not limited as such and similarly apply to other types of communication networks, including other types of cellular networks, such as an LTE network.

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device, including a wireless communications interface.

The term "base station" as used herein refers to a device with radio communication capabilities, that is a network component of a communications network (or, more briefly, a network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "network" as used herein reference to a communications network that includes a set of network nodes configured to provide communications functions to a plurality of user equipment via one or more base stations. For instance, the network can be a public land mobile network (PLMN) that implements one or more communication technologies including, for instance, 5G communications.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

The term "3GPP Access" refers to accesses (e.g., radio access technologies) that are specified by 3GPP standards. These accesses include, but are not limited to, GSM/GPRS, LTE, LTE-A, or 5G NR. In general, 3GPP access refers to various types of cellular access technologies.

The term "Non-3GPP Access" refers any accesses (e.g., radio access technologies) that are not specified by 3GPP standards. These accesses include, but are not limited to, WiMAX, CDMA2000, Wi-Fi, WLAN, or fixed networks. Non-3GPP accesses may be split into two categories, "trusted" and "untrusted": Trusted non-3GPP accesses can interact directly with an evolved packet core (EPC) or a 5G core (5GC), whereas untrusted non-3GPP accesses interwork with the EPC/5GC via a network entity, such as an Evolved Packet Data Gateway or a 5G NR gateway. In general, non-3GPP access refers to various types on non-cellular access technologies.

FIG. 1 illustrates a cell selection process, according to some embodiments. A UE 102 can be triggered to initiate a cell selection process. For example, when the UE 102 powers up, it can initiate a cell selection process to discover an appropriate carrier. The UE 102 can scan available RF channels within its supported frequency bands. The UE 102 can perform the scanning based on a synchronization raster, which defines a set of center frequencies for a synchronization signal/physical broadcast channel (SS-PBCH) block. As illustrated, the UE 102 can identify a first base station 104 and a second base station 106 based on their respective SS-PBCH blocks. In some embodiments, the first base station 104 serves a first cell, and the second base station 106 serves a second cell. In some further embodiments, the first cell is a macrocell, and the second cell is a microcell, or vice versa.

The UE 102 can scan for one or more SS-PBCH blocks at each candidate carrier frequency, wherein each candidate has a global synchronization channel number (GSCN). After discovering one or more SS-PBCH blocks at specific GSCNs, the UE 102 can proceed to identify a base station with which it may synchronize.

The UE 102 can identify which of the first base station 104 and the second base station 106 is the strongest based on an evaluation of the DL channel conditions and UL channel conditions.

The SS-PBCH block can be a DL transmission that includes a primary PSS and an SSS. For a first network, such as a 5G network, the UE 102 can use the SS-PBCH block to measure a synchronization reference signal received power (SS-RSRP) from the first base station 104 and the second base station 106. The SS-RSRP can be the linear average for the received SSS levels. In a second network, such as an LTE network, the UE 102 can measure the PSS and the SSS from the first base station 104 and the second base station 106.

The UE 102 can determine whether the measured values are within a threshold dB range of each other. For example, for the first network, the UE 102 can determine whether the measured SS-RSRPs of the first base station 104 and the second base station 106 are within a first threshold dB range of each other. For the second network, the UE 102 can determine whether the PSSs of the first base station 104 and second base station 106 are within a second threshold dB range of each other and whether the SSSs of the first base station 104 and the second base station 106 are within a third threshold dB range of each other.

If the UE 102 determines that the measured values are not within a threshold dB range of each other, the UE 102 can select either the first cell or the second cell based on the DL channel conditions. The UE 102 can select either the first cell or the second cell based on which cell exhibits greater DL channel conditions.

If the UE 102 determines that the measured values are within a threshold dB range of each other, the UE 102 can evaluate the first cell and the second cell based on UL channel conditions.

For example, the UE 102 can evaluate UL path-loss between the UE 102 and the first base station 104 at the first cell, and a UL path-loss between the UE 102 and the second base station 106 at the second cell.

The UE 102 can then determine whether either the first cell or the second cell has the greater DL channel conditions and the greater UL channel conditions. If the cell with the greater DL channel conditions also has the greatest UL channel conditions, the UE 102 can select the cell and initiate a radio access channel (RACH) procedure to synchronize with the selected cell.

If, however, the UE 102 determines that the cell with the greatest DL channel conditions is not the cell with the greatest UL channel conditions, the UE 102 can calculate the ratios of each cell's UL channel conditions to DL channel conditions. The UE 102 can further select the first cell or the second cell based on a comparison of the calculated ratios. Once the UE 102 selects a cell, the UE 102 can initiate a RACH procedure to synchronize with the selected cell.

Figure 2:
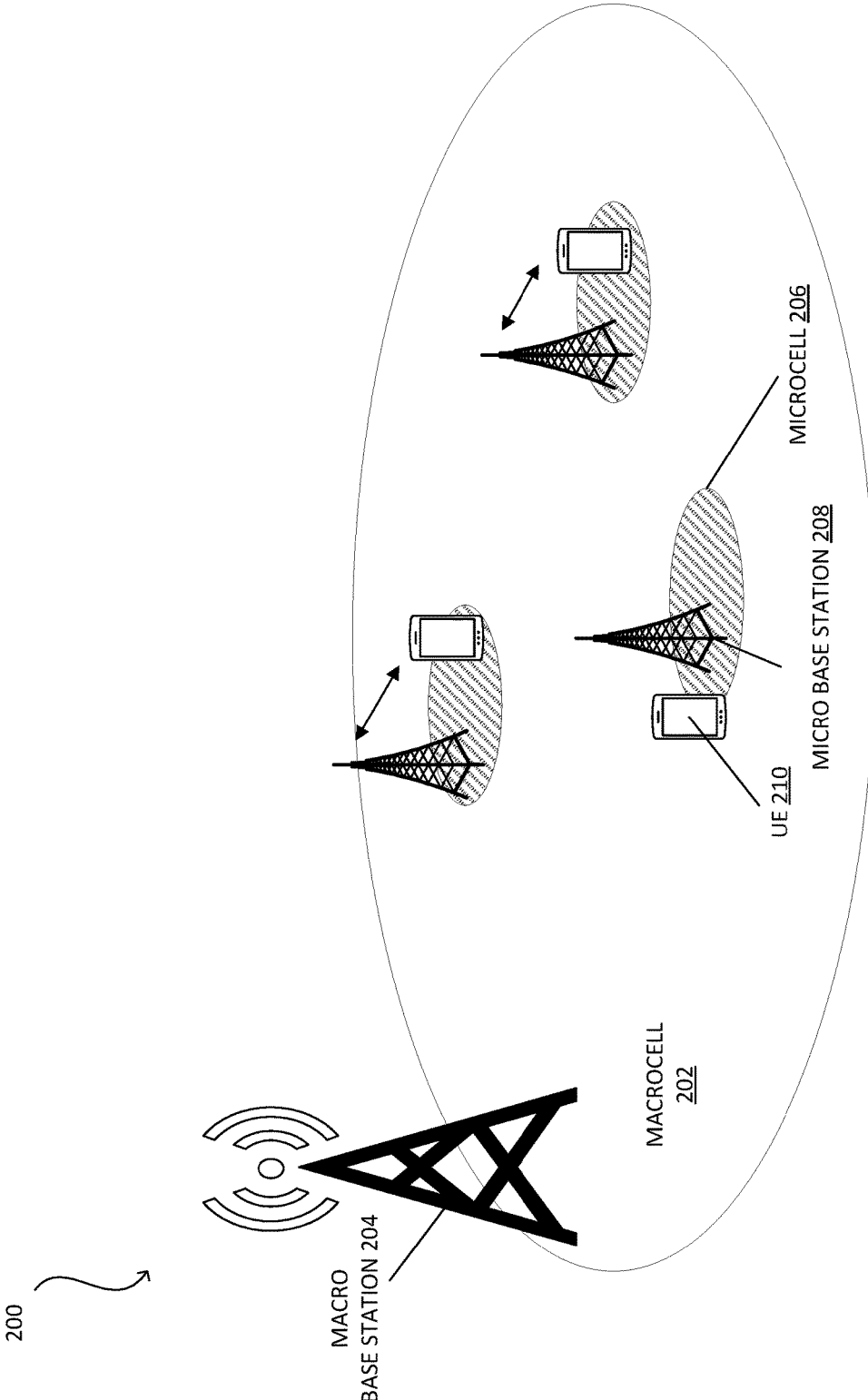
FIG. 2 illustrates an example system including a macrocell and a small cell, in accordance with some embodiments

FIG. 2 illustrates a cellular environment 200, according to some embodiments. A macrocell 202 can include a macro base station 204 that serves the macrocell 202. The macrocell 202 can be included in a first network, such as a 5G network, or a second network, such as an LTE network. The macrocell 202 can further include one or more microcells 206. In some instances, the microcell 206 is known as a small cell. In other instances, the microcell 206 is a type of small cell. Each microcell 206 can further include a micro base station 208, that offers many of the same capabilities as the macro base station 204. The microcell 206 can have a radius that is smaller than the radius of the macrocell 202 and can be arranged within a macrocell 202 in areas where the signals from the macro base station 204 are weak or unavailable. As illustrated, the UE 210 can be camped on the macrocell 202. In some instances, the UE 210 is camped closer to the micro base station 208 than the macro base station 204. In other instances, the UE 210 is camped farther from the micro base station 208 than the macro base station 204. In yet even other instances, the UE 210 is equidistant from the micro base station 208 and the macro base station 204.

The UE 220 can further be triggered to initiate a cell selection process. For example, the UE 210 can be triggered by being powered on. The UE 210 can further select between two or more cells with which it may synchronize. For example, the UE 210 can select between the macrocell 202 and the microcell 206. The cell selection criteria can include an evaluation of DL channel conditions between the UE 210 and the macro base station 204 and micro base station 208. The cell selection criteria can further include an evaluation of UL channel conditions between the UE 210 and the macro base station 204 and micro base station 208. In situations in which the DL channel conditions of the macrocell 202 and the microcell 206 are not similar, the UE 210 can select the cell with the greater DL channel conditions. The DL channel conditions can include a measured value of an SS-RSRP for a first network, such as a 5G network. The DL channel conditions can also be measured values of a PSS and an SSS for a second network, such as an LTE network. In situations in which the DL channel conditions of the cells are similar, the UE can further evaluate the UL channel conditions. The UL channel conditions can include a UL path-loss. It should be appreciated that in another scenario, the UE 210 can select between different combinations of two or more macrocells and microcells.

Figure 3:
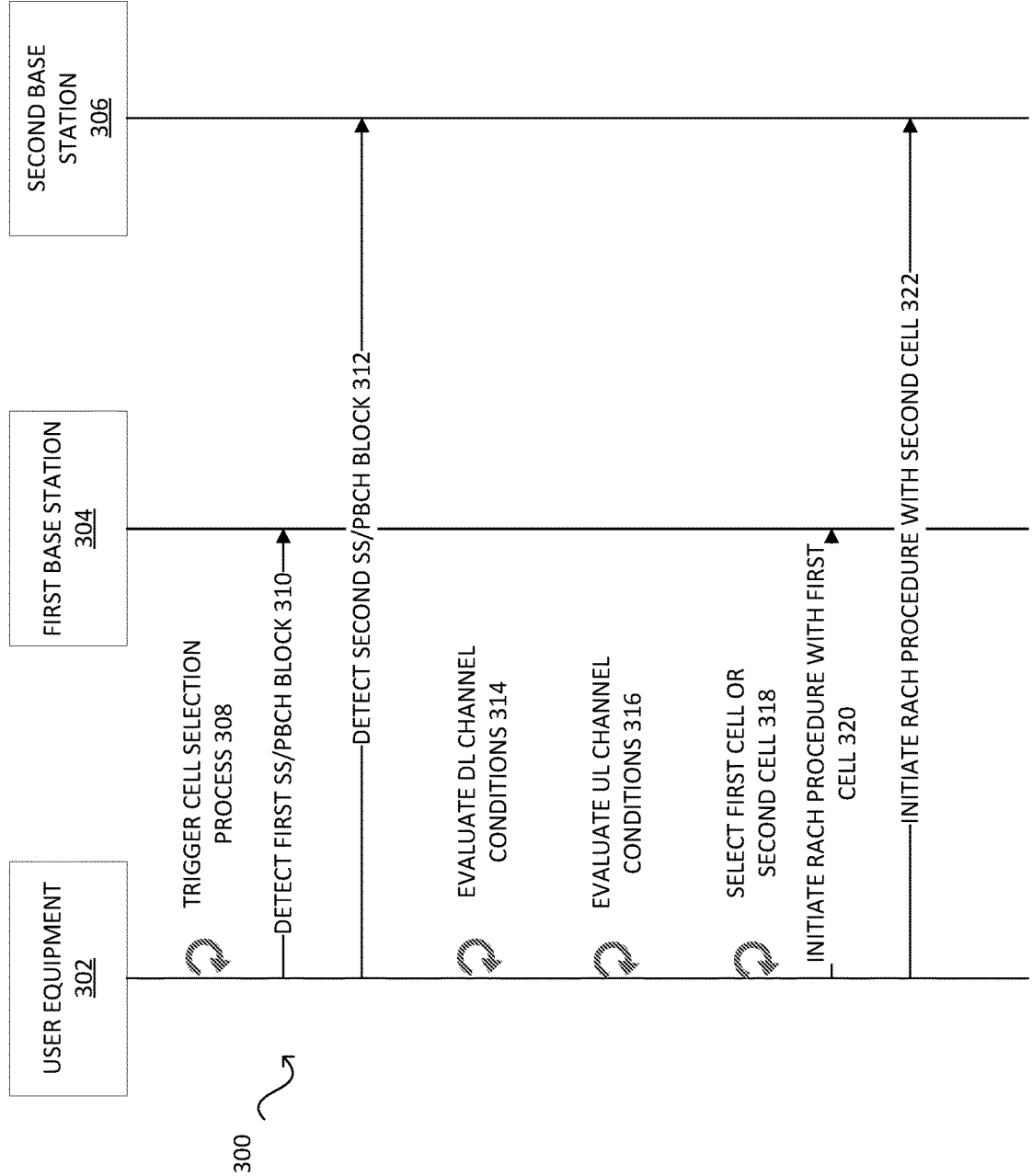
FIG. 3 illustrates an example signaling diagram for smart cell selection, in accordance with some embodiments.

FIG. 3 is a signaling diagram 300 for a cell selection process, in accordance with some embodiments. At 302, a UE can be triggered to initiate a cell section process. The triggering event can be, for example, a radio access technology (RAT) change, an out-of-service event, an access point (AP) toggle, a radio link failure, or a baseband (BB) reboot.

At 310, the UE 302 can detect an SS-PBCH block of a first base station 304 of a first cell. The SS-PBCH block can be a DL transmission from the first base station 304 that includes a PSS and an SSS.

At 312, the UE 302 can detect an SS-PBCH block of a second base station 306 of a second cell. The SS-PBCH block can be a DL transmission from the second base station 306 that also includes a PSS and an SSS.

At 314, the UE 302 can evaluate the DL channel conditions for the first base station 304 and the second base station 306 based on the respective detected SS-PBCH blocks. The evaluation can be, for example, to determine whether the DL channel conditions for each cell are similar. The similarity can be based on whether the measured values are within a threshold dB range.

In some instances, the measured values will not be within the threshold dB range. In these instances, the UE 303 can select the cell based on a comparison of the DL channel conditions of the first base station 304 and the second base station 306.

At 316, assuming that the measured DL channel conditions are similar, the UE 302 can evaluate the UL channel conditions of the first base station 304 and the second base station 306. For example, the UE 302 can calculate a UL path-loss for the first base station 304 and the second base station 306.

The UE can determine whether either the first base station 304 or the second base station 306 has the greatest DL channel conditions and the greatest UL channel conditions. If either the first base station 304 or the second base station 306 has both the greatest DL and UL channel conditions, the UE 302 can select that cell. If, however, one of the first base station 304 and the second base station 306 has the greatest DL channel condition, and the other of the first base station 304 and the second base station 306 has the greatest UL channel condition, the UE 302 can evaluate further.

The UE 302 can calculate a ratio of measured values for DL channel conditions to measured values of UL channel conditions for both the first base station 304 and the second base station 306. The UE 302 can further compare the respective ratios of each of the first base station 304 and the second base station 306.

At 318, the UE 302 can select either the first cell or the second cell based on the above-described comparisons. At 320 or 322, the UE 302 can initiate a RACH procedure to synchronize with either the first base station 304 or the second base station 306 based on the selection.

Figure 4:
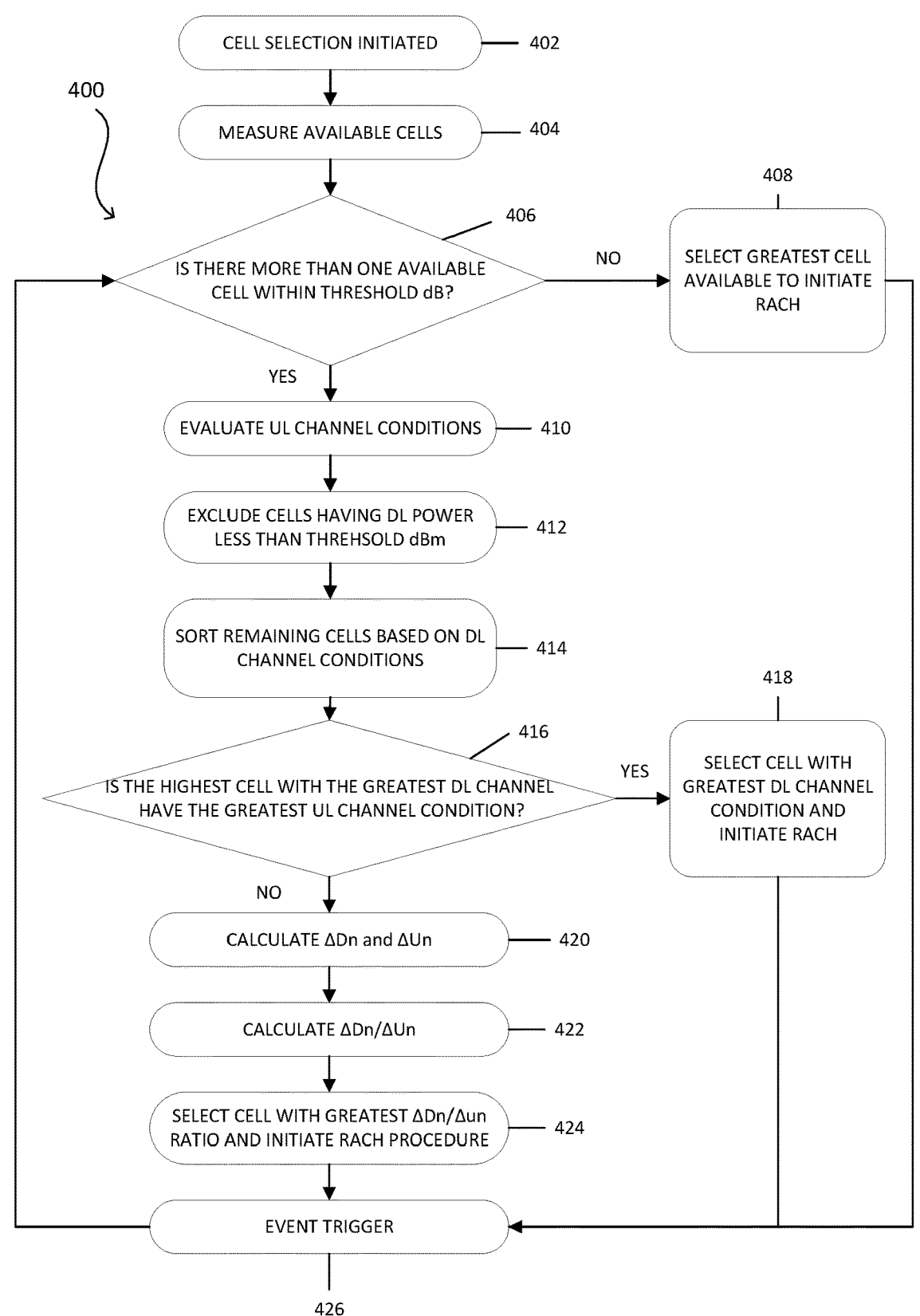
FIG. 4 illustrates an example process flow for smart cell selection, in accordance with some embodiments.

FIG. 4 illustrates a process flow 400 for smart cell selection. At 402, a UE can initiate a cell selection procedure. The cell selection procedure can be initiated, for example, when a UE is switched on, after the UE leaves a radio resource control (RRC) connected mode), or after a UE returns to an area of coverage.

At 404, the UE can measure the SS-RSRP block of each candidate cell of a first network, such as a 5G network. For a second network, such as an LTE network, the UE can measure the PSS and the SSS of each candidate cell.

At 406, the UE can determine, based on the measurement, whether it can detect more than one cell with measured DL channel conditions, such as DL signal strength, within a threshold dB range. The threshold dB range may be a predefined range (for example, defined in a 3GPP Technical Specification) or may be configured to the UE by a base station. If the UE cannot detect more than one cell with measured DL channel conditions within the threshold dB range, the process 400 proceeds to 408.

At 408, the UE can select the cell with the greatest measured DL channel conditions and initiate a random access channel (RACH) procedure to synchronize with the cell. The RACH procedure can enable the UE to achieve UL synchronization with a base station of the selected cell. The RACH procedure can also enable the UE to obtain resources from the base station.

At 406, if the UE does detect more than one cell with DL channel conditions within the threshold dB range, the process 400 proceeds to 410. At 410, the UE can evaluate UL channel conditions, such as the UL path-loss of each candidate cell. If the UE is operating in a time division duplexing (TDD) mode, the UL path-loss is equal to the DL path-loss (e.g., UL path loss=DL path-loss). If, however, the UE is operating a frequency division duplexing (FDD) mode, the UL path-loss is approximately equal to the DL path-loss minus a propagation delta (ΔP) (e.g., UL path loss≈DL path-loss−ΔP). As the UE is using a different frequency for UL than DL, the UE must consider the difference in propagation loss (e.g., ΔP) between the different frequencies before determining the UL path-loss.

In some embodiments, the UE can calculate the ΔP via the following steps. The UE can assume a transmission gain (Tg) and a reception gain (Rg) based on a distance "d" between the UE and the base station for the cell that is being evaluated for ΔP. The UE can calculate ΔP as propagation loss in the UL frequency minus the propagation loss in the DL frequency. The UE can further calculate the DL path-loss as being equal to reference signal (RS) power minus measured DL power (e.g., RS power—measured DL power). The RS power can be derived from a system information block 2 (SIB 2) transmission. The UE can be preconfigured to include Tg and Rg values based on a distance between the UE and the base station.

At 412, the UE can exclude candidate cells that have a DL power less than a threshold decibel-milliwatts (dBm). This step helps reduce the number of candidate cells.

At 414, the UE can rank the remaining cells based on the DL channel conditions. At 416, the UE can determine whether the cell that has the greatest DL channel conditions has the greatest UL channel conditions. If the cell with the greatest DL channel conditions has the greatest UL channel conditions, the process 400 can proceed to 418.

At 418, the UE can select the cell with the greatest DL channel conditions and UL channel conditions and initiate a RACH procedure to synchronize with the selected cell.

If, however, the cell with the best DL channel conditions does not have the best UL channel conditions, the process 400 can proceed to 420. At 420, the UE can calculate a difference in DL signal strength (ΔDn) between the cell with the best DL channel conditions and a candidate cell (cell1), where the candidate cell that is being evaluated for cell selection. For example, the ΔD1 can be equal to the RSRP of the cell with the best DL channel conditions (e.g., the cell with the best RSRP) minus the RSRP of the reference cell. The UE can make this calculation between the cell with the best DL channel conditions and each other candidate cell.

The UE can further calculate a difference in UL path-loss (ΔUn) between the cell with the best DL channel conditions and a reference cell (cell1), where the reference cell is a cell that is being evaluated for cell selection. For example, ΔU1 can be equal to the UL path-loss of the cell with the best DL channel conditions minus the UL path-loss of the reference cell. The UE can make this calculation between the cell with the best DL channel conditions and each other candidate cell.

At 422, the UE can calculate respective ratios of DL channel conditions and UL channel conditions between the cell with the greatest DL channel conditions and each other candidate cell.

At 424, the UE can select the cell with the greatest DL channel condition to UL channel condition ratio ($\Delta Dn/\Delta Un$). In some embodiments, this can be the highest ratio value.

At 426, the UE can detect a triggering event to reinitiate the cell selection process. The triggering event can be, for example, a radio access technology (RAT) change, an out-of-service event, an access point (AP) toggle, a radio link failure, or a baseband (BB) reboot.

FIG. 5 is an illustration of a process 500 for smart cell selection, in accordance with some embodiments. At 502, a UE can initiate a cell selection procedure to choose between a first cell and a second cell. The UE can initiate the cell selection procedure based on, for example, a triggering event, such as a RAT change, an out-of-service event, an $\Delta P$ toggle, a radio link failure, or a BB reboot. In some instances, the first cell is a macrocell and the second cell is a microcell.

At 504, the UE can evaluate a first UL channel condition of the first cell and a second UL channel condition of the second cell. The first UL channel condition of the first cell can be, for example, a first UL path-loss between the UE and a first base station of the first cell. The second UL channel condition can be, for example, a second UL path-loss between the UE and a second base station of the second cell.

At 506, the UE can select either the first cell or the second cell based on the evaluated first UL channel condition and the second UL channel condition. For example, the UE can select either the first cell or the second cell based on a comparison of the first UL path-loss and the second UL path-loss.

At 508, the UE can initiate a RACH procedure based on the selected first cell or second cell. The UE can further synchronize with the base station of the selected cell.

FIG. 6 is an illustration of a process 600 for smart cell selection, in accordance with some embodiments. At 602, a UE can detect a triggering event to initiate a cell selection procedure. The triggering event can be a RAT change, an out-of-service event, an AP toggle, a radio link failure, or a BB reboot.

At 604, the UE can evaluate a first DL channel condition of a first cell and a second DL channel condition of a second cell. In some embodiments, the first DL channel condition is based on a first measured SS-RSRP, and the second DL channel condition is based on a second measured SS-RSRP. In other embodiments, the first DL channel condition is based on a first PSS and a first SSS, and the second DL channel condition is based on a second PSS and a second SSS.

At 606, the UE can evaluate a first UL channel condition of the first cell and a second UL channel condition of the second cell based on the evaluation of the DL channel conditions of the first cell and the second cell. For example, the comparison can be based on determining that a measured value of the first DL channel condition is within a threshold dB range of the measured value of the second DL channel condition. The first UL channel condition of the first cell can be, for example, a first UL path-loss between the UE and a first base station of the first cell. The second UL channel condition can be, for example, a second UL path-loss between the UE and a second base station of the second cell.

At 608, the UE can select either the first cell or the second cell based on the evaluation of the first UL channel condition and the second UL channel condition. For example, the UE can make the selection based on a comparison of the first UL path-loss and the second UL path-loss.

FIG. 7 is an illustration of a process 700 for smart cell selection, in accordance with some embodiments. At 702, a UE can initiate a cell selection process. The UE can initiate the cell selection procedure based on, for example, a triggering event, such as a RAT change, an out-of-service event, an AP toggle, a radio link failure, or a BB reboot. In some instances, the first cell is a macrocell and the second cell is a microcell.

At 704, the UE can evaluate the DL channel conditions of a plurality of cells based on the initiation. In some embodiments, the DL channel condition of each cell of the plurality of cells is based on a respective measured SS-RSRP. In other embodiments, the DL channel condition of each cell of the plurality of cells is based on a respective PSS and SSS.

At 706, the UE can evaluate the UL channel conditions of at least two cells of the plurality of cells based on the evaluation of the DL channel conditions of the plurality of cells. The UL channel condition of each cell of the at least two cells can be, for example, a respective UL path-loss between the UE and a base station of the cell of the at least two cells.

At 708, the UE can select a cell from the at least two cells based on the evaluation of the UL channel conditions. For example, the UE can make the selection based on a comparison of the respective UL path-loss of each cell of the at least two cells.

Figure 8:
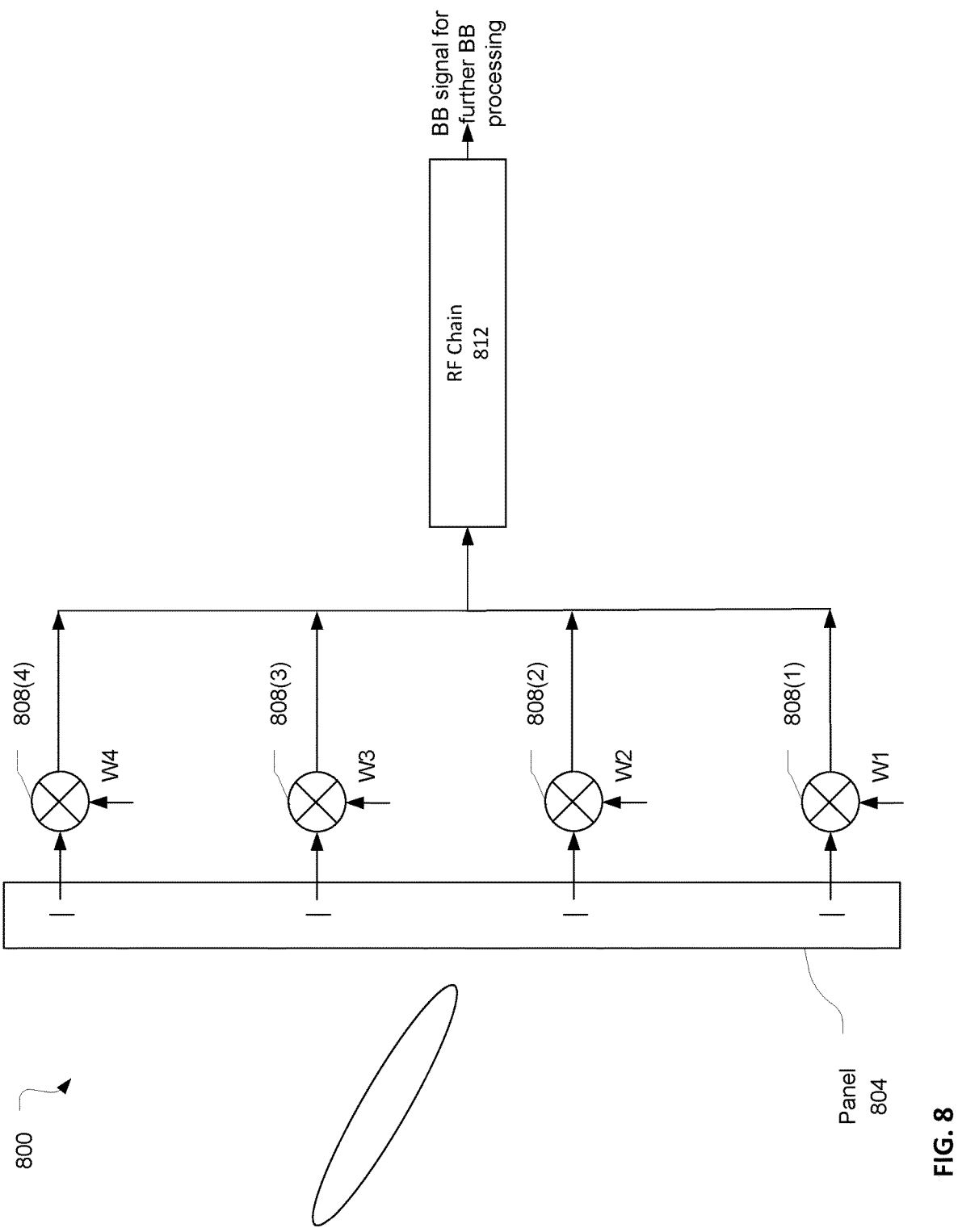
FIG. 8 illustrates an example of receive components, in accordance with some embodiments.

FIG. 8 illustrates receive components 800 of the UE 806, in accordance with some embodiments. The receive components 800 may include an antenna panel 804 that includes a number of antenna elements. The panel 804 is shown with four antenna elements, but other embodiments may include other numbers.

The antenna panel 804 may be coupled to analog beamforming (BF) components that include a number of phase shifters 808(1)-808(4). The phase shifters 808(1)-808(4) may be coupled with a radio-frequency (RF) chain 812. The RF chain 812 may amplify a receive analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (e.g., W1-W4), which may represent phase shift values, to the phase shifters 808(1)-808(4) to provide a receive beam at the antenna panel 804. These BF weights may be determined based on the channel-based beamforming.

Figure 9:
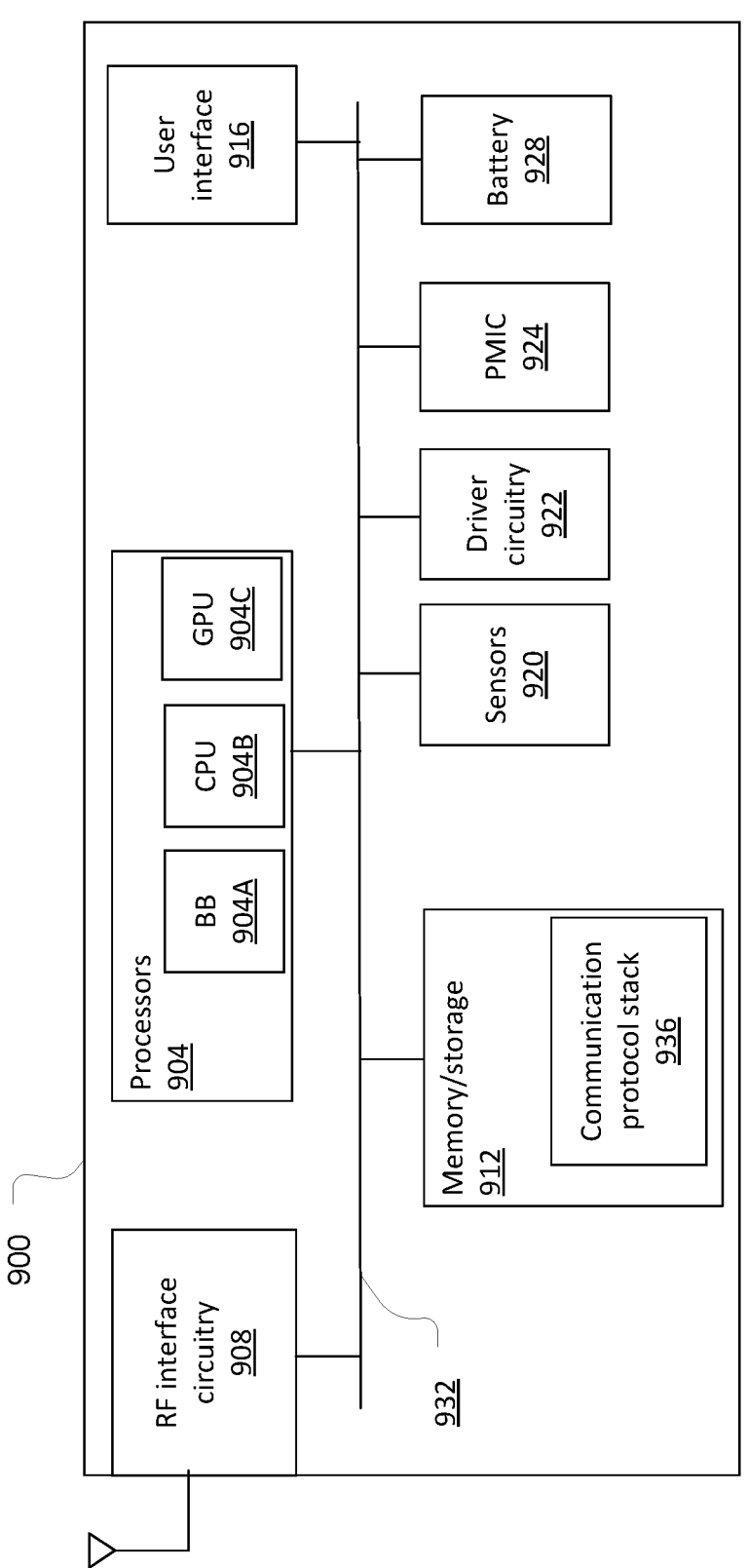
FIG. 9 illustrates an example of a UE, in accordance with some embodiments.

FIG. 9 illustrates a UE 900, in accordance with some embodiments. The UE 900 may be similar to and substantially interchangeable with UE 806 of FIG. 8.

Similar to that described above with respect to UE 900, the UE 900 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 900 may include processors 904, RF interface circuitry 908, memory/storage 912, user interface 916, sensors 920, driver circuitry 922, power management integrated circuit (PMIC) 924, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangements of the components shown may occur in other implementations.

The components of the UE 900 may be coupled with various other components over one or more interconnects 932, which may represent any type of interface, input/output, bus (local, system, or expansion), transmission line, trace, optical connection, etc. that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 904A may also access group information 924 from memory/storage 912 to determine search space groups in which a number of repetitions of a PDCCH may be transmitted.

The memory/storage 912 may include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 908 may include transceiver circuitry and a radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 924 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 924.

In various embodiments, the RF interface circuitry 908 may be configured to transmit/receive signals in a manner compatible with NR access technologies.

The antenna 924 may include a number of antenna elements that each convert electrical signals into radio waves to travel through the air and to convert received radio waves into electrical signals. The antenna elements may be arranged into one or more antenna panels. The antenna 924 may have antenna panels that are omnidirectional, directional, or a combination thereof to enable beamforming and multiple input, multiple output communications. The antenna 924 may include microstrip antennas, printed antennas fabricated on the surface of one or more printed circuit boards, patch antennas, phased array antennas, etc. The antenna 924 may have one or more panels designed for specific frequency bands including bands in FR1 or FR2.

The user interface circuitry 916 includes various input/output (I/O) devices designed to enable user interaction with the UE 900. The user interface 916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 900.

The sensors 920 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 922 may include software and hardware elements that operate to control particular devices that are embedded in the UE 900, attached to the UE 900, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

In some embodiments, the PMIC 924 may control, or otherwise be part of, various power saving mechanisms of the UE 900. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 900 may power down for brief intervals of time and thus save power. If there is no data traffic activity for an extended period of time, then the UE 900 may transition off to an RRC Idle state, where it disconnects from the network and does not perform operations such as channel quality feedback, handover, etc. The UE 900 goes into a very low power state and it performs paging where again it periodically wakes up to listen to the network and then powers down again. The UE 900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 928 may power the UE 900, although in some examples the UE 900 may be mounted deployed in a fixed location, and may have a power supply coupled to an electrical grid. The battery 928 may be a lithium ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
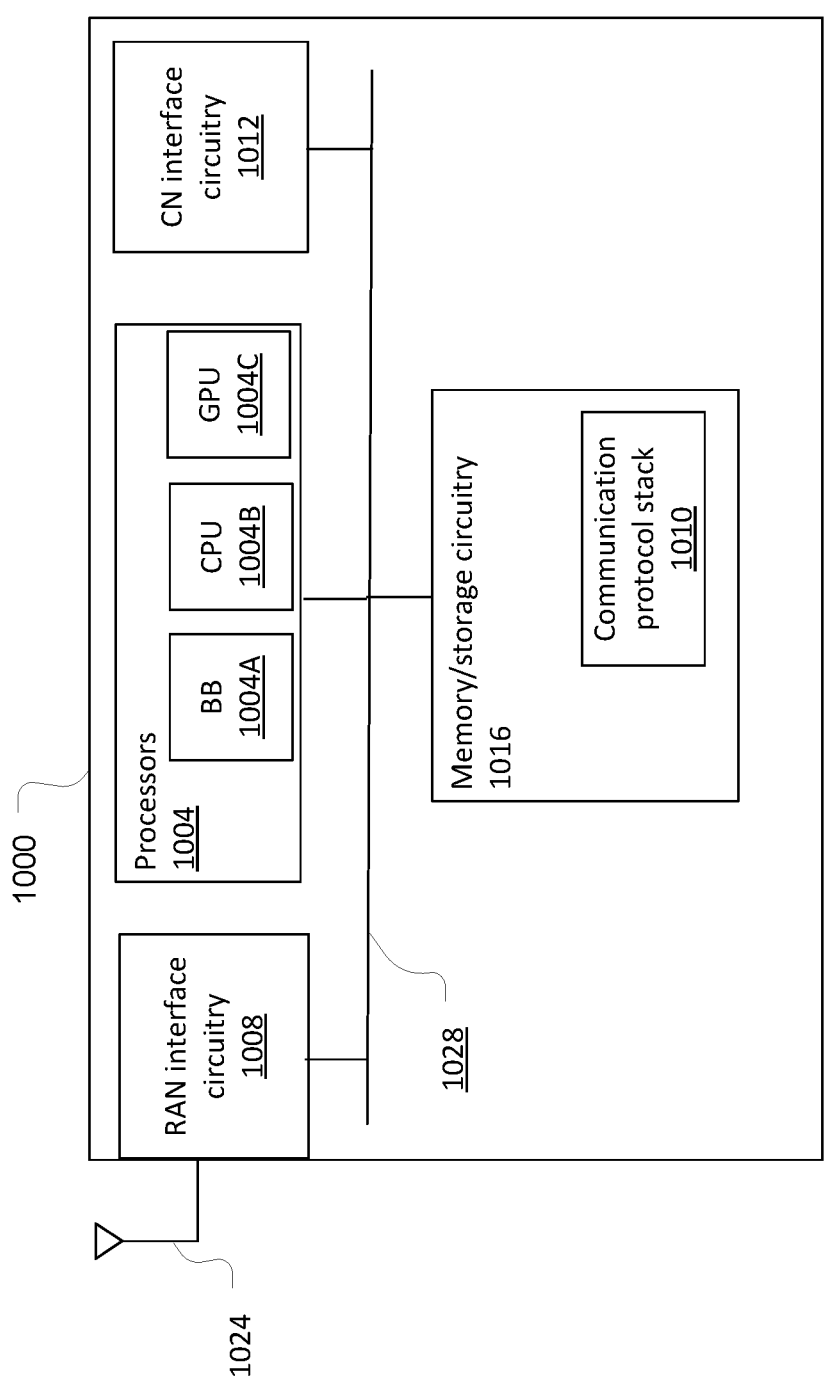
FIG. 10 illustrates an example of a base station, in accordance with some embodiments.

FIG. 10 illustrates a gNB 1000, in accordance with some embodiments. The gNB node 1000 may be similar to and substantially interchangeable with the base stations 104, 106 of FIG. 1.

The gNB 1000 may include processors 1004, RF interface circuitry 1008, core network (CN) interface circuitry 1012, and memory/storage circuitry 1016.

The components of the gNB 1000 may be coupled with various other components over one or more interconnects 1028.

The processors 1004, RF interface circuitry 1008, memory/storage circuitry 1016 (including communication protocol stack 1010), antenna 1024, and interconnects 1028 may be similar to like-named elements shown and described with respect to FIG. 8.

The CN interface circuitry 1012 may provide connectivity to a core network, for example, a 4$^{th}$ Generation Core network (5GC) using a 4GC-compatible network interface protocol such as carrier Ethernet protocols, or some other suitable protocol. Network connectivity may be provided to/from the gNB 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method, comprising initiating, by a UE, a cell selection process to choose between a first cell and a second cell; evaluating, by the UE, a first UL channel condition of the first cell and a second UL channel condition of the second cell based on the initiation; selecting, by the UE, the first cell or the second cell based on the evaluated first UL channel condition and second UL channel condition; and initiating, by the UE, a RACH procedure based on the selected first cell or second cell.

Example 2 includes the method of example 1, wherein the first UL channel condition is a first UL path-loss between the UE and a first base station, and the second UL channel condition is a second UL path-loss between the UE and a second base station.

Example 3 includes the method of example 2, wherein the UE operates in a TDD mode, the first UL path-loss is equal to a first DL path-loss between the UE and the first base station, and the second UL path-loss is equal to a second DL path-loss between the UE and the second base station.

Example 4 includes the method of example 2, wherein the UE operates in a FDD mode and the method further comprises calculating the first UL path-loss based on a first DL path-loss and a propagation loss over a first UL frequency; calculating the second UL path-loss based on a second DL path-loss and a propagation loss over a second DL frequency; and selecting the first cell or the second cell based on the calculated first UL path-loss and second UL path-loss.

Example 5 includes the method of any of examples 1-4, wherein the method further comprises evaluating a first DL channel condition of the first cell based on a measurement of a first SS-RSRP of the first cell; evaluating a second DL channel condition of the second cell based on a measurement of a second SS-RSRP of the second cell; determining whether the first SS-RSRP and the second SS-RSRP are within a threshold range of a reference value; and evaluating the first UL channel condition and the second UL channel condition based on whether the first SS-RSRP and the second SS-RSRP are within the threshold range of the reference value.

Example 6 includes the method of any of examples 1-4, wherein the method further comprises evaluating a first DL channel condition of the first cell based on a measurement of a first PSS and a first SSS of the first cell; evaluating a second DL channel condition of the second cell based on a measurement of a second PSS and a second SSS of the second cell; determining whether the first PSS and the second PSS are within a first threshold range; determining whether the first SSS and the first SSS are within a second threshold range; and evaluating the first UL channel condition and the second UL channel condition based on whether the first PSS and the second PSS are within a first threshold range, and whether the first SSS and the second SSS are within a second threshold range.

Example 7 includes the method of any of examples 1-6, wherein the first cell is a macrocell and the second cell is a microcell.

Example 8 includes a system comprising means to perform one or more elements of a method described in or related to examples 1-7.

Example 9 includes a non-transitory computer-readable media comprising instructions to cause a network, upon execution of the instructions by one or more processors of the network, to perform one or more elements of a method described in or related to any of examples 1-7.

Example 10 includes a user equipment (UE), including memory; processing circuitry, coupled with the memory, to: detect a triggering event to initiate a cell selection process; evaluating a first DL channel condition of a first cell and second DL channel condition of a second cell; evaluate a first UL channel condition of the first cell and a second UL channel condition of a second cell based on the evaluation of the first DL channel condition and the second DL channel condition; and select either the first cell or the second cell based on the evaluation of the first UL channel condition and the second UL channel condition.

Example 11 includes the UE of example 10, wherein the processing circuitry, coupled with the memory, further to initiate a RACH procedure based on the selected first cell or second cell.

Example 12 includes the UE of any of examples 10 or 11, wherein the triggering event is a RAT change, an out-of-service event, an AP toggle, a radio link failure, or a BB reboot.

Example 13 includes the UE of any of examples 10-12, wherein the first DL channel condition is based on a first measured SS-RSRP, or the first DL channel condition is based on a first PSS and a first SSS.

Example 14 includes the UE of any of examples 10-13, wherein the processing circuitry, coupled with the memory, further to compare the first UL channel condition and the first DL channel condition with the second UL channel condition and the second DL channel condition; and selecting the first cell or the second cell based on the comparison.

Example 15 includes the UE of any of examples 10-14, wherein the processing circuitry, coupled with the memory, further to compare the first UL channel condition and the first DL channel condition with the second UL channel condition and the second DL channel condition; calculating a first ratio of the first UL channel condition and the first DL channel condition based on the comparison; calculating a second ratio of the second UL channel condition and the second DL channel condition based on the comparison; comparing the first ratio to the second ratio; selecting the first cell or the second cell based on the comparison of the first ratio and the second ratio.

Example 16 includes the UE of any of examples 10-15, wherein one of the first cell or the second cell is a macrocell, and wherein the other of the first cell or second cell is a microcell.

Example 17 includes a method, performed by a UE, the method includes performing one or more elements described in or related to any of examples 10-16.

Example 18 includes a non-transitory computer-readable media comprising instructions to cause a network, upon execution of the instructions by one or more processors of the network, to perform one or more elements of a method described in or related to any of examples 10-16.

Example 19 includes one or more non-transitory computer-readable media including stored thereon instructions that, when executed by one or more processors, cause a UE to: initiate a cell selection process; evaluate DL channel conditions of a plurality of cells based on the initiation; evaluate UL channel conditions of at least two cells of the plurality of cells based on the evaluation of the DL channel conditions of the plurality of cells; and select a cell from the at least two cells based on the evaluation of the UL channel conditions of the at least two cells.

Example 20 includes the one or more non-transitory computer-readable media of example 19, wherein the at least two cells comprises a subset of the plurality of cells.

Example 21 includes the one or more non-transitory computer-readable media of any of examples 19 or 20, wherein the instructions that, when executed by one or more processors, further cause the UE to generate a sorted order of cells by sorting the at least two cells in decreasing order of respective DL channel conditions, the cell being a first cell in the sorted order of cells.

Example 22 includes the one or more non-transitory computer-readable media of any of examples 19-21, wherein the instructions that, when executed by one or more processors, further cause the UE to determine the first cell has a greatest UL channel condition of the at least two cells; and selecting the first cell based on said determining.

Example 23 includes the one or more non-transitory computer-readable media of any of examples 19-22, wherein the instructions that, when executed by one or more processors, further cause the UE to detect an event trigger; and initiating the cell selection process based on the detected event trigger.

Example 24 includes the one or more non-transitory computer-readable media of any of examples 19-23, wherein the at least two cells include a macrocell and a microcell.

Example 25 includes a device comprising means to perform one or more elements of a method described in or related to examples 19-24.

Example 26 includes a method, performed by a UE, the method includes performing one or more elements described in or related to any of examples 19-24.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
initiating a cell selection process to choose between a first cell and a second cell;
evaluating a first uplink (UL) channel condition of the first cell based on a first downlink (DL) path-loss between a user equipment (UE) and a first base station, wherein the first DL path-loss is based on measurement of a first synchronization signal;
evaluating a second UL channel condition of the second cell based on a second DL path-loss between the UE and a second base station, wherein the second DL path-loss is based on measurement of a second synchronization signal;
selecting the first cell or the second cell based on said evaluating of the first UL channel condition and said evaluating of the second UL channel condition; and
initiating a random access channel (RACH) procedure based on the selected first cell or second cell.

2. The method of claim 1, wherein the first UL channel condition is a first UL path-loss between the UE and the first base station, and the second UL channel condition is a second UL path-loss between the UE and the second base station.

3. The method of claim 2, wherein the UE operates in a time division duplexing (TDD) mode, the first UL path-loss is equal to the first DL path, and the second UL path-loss is equal to the second DL path-loss.

4. The method of claim 2, wherein the UE operates in a frequency division duplexing (FDD) mode and the method further comprises:
calculating the first UL path-loss based on the first DL path-loss and a propagation loss over a first UL frequency;
calculating the second UL path-loss based on the second DL path-loss and a propagation loss over a second UL frequency; and
selecting the first cell or the second cell based on the calculated first UL path-loss and second UL path-loss.

5. The method of claim 1, wherein the method further comprises:
evaluating a first DL channel condition of the first cell based on a measurement of a first synchronization signal-reference signal received power (SS-RSRP) of the first cell;
evaluating a second DL channel condition of the second cell based on a measurement of a second SS-RSRP of the second cell;

determining whether the first SS-RSRP and the second SS-RSRP are within a threshold range of a reference value; and
evaluating the first UL channel condition and the second UL channel condition based on whether the first SS-RSRP and the second SS-RSRP are within the threshold range of the reference value.

6. The method of claim 1, wherein the method further comprises:
evaluating a first DL channel condition of the first cell based on a measurement of a first primary synchronization signal (PSS) and a first secondary synchronization signal (SSS) of the first cell;
evaluating a second DL channel condition of the second cell based on a measurement of a second PSS and a second SSS of the second cell;
determining whether the first PSS and the second PSS are within a first threshold range;
determining whether the first SSS and the second SSS are within a second threshold range; and
evaluating the first UL channel condition and the second UL channel condition based on whether the first PSS and the second PSS are within the first threshold range, and whether the first SSS and the second SSS are within the second threshold range.

7. The method of claim 1, wherein the first cell is a macrocell and the second cell is a microcell.

8. An apparatus, comprising:
memory to store instructions;
processing circuitry, coupled with the memory, to execute the instructions to:
detect a triggering event to initiate a cell selection process;
determine a first downlink (DL) channel condition of a first cell based on a first DL path-loss between a user equipment (UE) and a first base station, wherein the first DL channel condition is based on a first measured synchronization signal;
determine a first uplink (UL) channel condition of the first cell based on the first DL channel condition;
determine a second DL channel condition of a second cell based on a second DL path-loss between the UE and a second base station, wherein the second DL channel condition is based on a second measured synchronization signal;
determine a second UL channel condition of the second cell based on the second DL channel condition; and
select either the first cell or the second cell based on the first UL channel condition and the second UL channel condition.

9. The apparatus of claim 8, wherein the processing circuitry is further to initiate a radio access channel (RACH) procedure based on the selected first cell or second cell.

10. The apparatus of claim 8, wherein the triggering event is a radio access technology (RAT) change, an out-of-service event, an access point (AP) toggle, a radio link failure, or a baseband (BB) reboot.

11. The apparatus of claim 8, wherein:
the first measured synchronization signal is based on a first measured synchronization signal reference signal received power (SS-RSRP), or the first measured synchronization signal is based on a first primary synchronization signal (PSS) and a first secondary synchronization signal (SSS); and the second measured synchronization signal is based on a second measured SS-RSRP or the second measured synchronization is based on a second PSS and a second SSS.

12. The apparatus of claim 8, wherein the processing circuitry is further to:

compare the first UL channel condition and the first DL channel condition with the second UL channel condition and the second DL channel condition; and select the first cell or the second cell based on the comparison.

13. The apparatus of claim 8, wherein the processing circuitry is further to:

compare the first UL channel condition and the first DL channel condition with the second UL channel condition and the second DL channel condition;

calculate a first ratio of the first UL channel condition and the first DL channel condition based on the comparison;

calculate a second ratio of the second UL channel condition and the second DL channel condition based on the comparison;

compare the first ratio to the second ratio; and select the first cell or the second cell based on the comparison of the first ratio and the second ratio.

14. The apparatus of claim 8, wherein one of the first cell or the second cell is a macrocell, and wherein the other of the first cell or second cell is a microcell.

15. A method, comprising:

initiating a cell selection process;

determining downlink (DL) channel conditions of a plurality of cells based on respective DL path-losses between a user equipment (UE) and corresponding base stations, wherein the respective DL path-losses are based on measurement of synchronization signals of the corresponding base stations;

evaluating uplink (UL) channel conditions of at least two cells of the plurality of cells based on the DL channel conditions of the plurality of cells; and selecting a cell from the at least two cells based on the evaluating of the UL channel conditions of the at least two cells.

16. The method of claim 15, wherein the at least two cells comprises a subset of the plurality of cells.

17. The method of claim 15, further comprising: generating a sorted order of cells by sorting the at least two cells in decreasing order of respective DL channel conditions, the cell being a first cell in the sorted order of cells.

18. The method of claim 17, further comprising: determining the first cell has a greatest UL channel condition of the at least two cells; and selecting the first cell based on said determining.

19. The method of claim 15, further comprising:

detecting an event trigger; and initiating the cell selection process based on the detected event trigger.

20. The method of claim 15, wherein the at least two cells include a macrocell and a microcell.

\* \* \* \* \*